United States Patent
Blanchard et al.

(10) Patent No.: US 9,422,818 B2
(45) Date of Patent: Aug. 23, 2016

(54) GAS TURBINE ENGINE ROTOR WHEEL HAVING COMPOSITE MATERIAL BLADES WITH BLADE-ROOT TO DISK CONNECTION BEING OBTAINED BY CLAMPING

(75) Inventors: Stephane Pierre Guillaume Blanchard, Chartrettes (FR); Laurent Pierre Joseph Ricou, Melun (FR)

(73) Assignee: SNECMA, Paris (FR)

( * ) Notice: Subject to any disclaimer, the term of this patent is extended or adjusted under 35 U.S.C. 154(b) by 773 days.

(21) Appl. No.: 13/698,208

(22) PCT Filed: Jun. 21, 2011

(86) PCT No.: PCT/FR2011/051424
§ 371 (c)(1),
(2), (4) Date: Feb. 25, 2013

(87) PCT Pub. No.: WO2011/161371
PCT Pub. Date: Dec. 29, 2011

(65) Prior Publication Data
US 2013/0156590 A1    Jun. 20, 2013

(30) Foreign Application Priority Data
Jun. 25, 2010  (FR) ..................... 10 55113

(51) Int. Cl.
*F01D 5/30* (2006.01)
*F01D 5/28* (2006.01)

(52) U.S. Cl.
CPC ............ *F01D 5/3023* (2013.01); *F01D 5/3046* (2013.01); *F01D 5/3053* (2013.01); *F01D 5/3069* (2013.01); *F01D 5/282* (2013.01); *F05D 2250/25* (2013.01); *Y02T 50/672* (2013.01)

(58) Field of Classification Search
CPC ...... F01D 5/303; F01D 5/3038; F01D 5/3069; F01D 5/3015; F01D 5/3023–5/3046; F01D 5/3053
USPC .............. 416/220 R, 214 A, 207, 208, 214 R, 416/219 R, 221
See application file for complete search history.

(56) References Cited

U.S. PATENT DOCUMENTS 2,220,918 A * 11/1940 Smith ..................... F01D 5/225
416/191
2,755,063 A * 7/1956 Wilkinson ............ F01D 5/3015
192/105 BA (Continued)

FOREIGN PATENT DOCUMENTS

DE           165854        10/1904
FR          2 918 409        1/2009

(Continued)

OTHER PUBLICATIONS

International Search Report Issued Oct. 27, 2011 in PCT/FR11/51424 Filed Jun. 21, 2011.

*Primary Examiner* — Alexander Comley
(74) *Attorney, Agent, or Firm* — Oblon, McClelland, Maier & Neustadt, L.L.P.

(57) ABSTRACT

A rotor wheel for a gas turbine engine, the wheel including: a metal holder disk including a plurality of teeth at its periphery, the teeth extending radially outwards from the disk; a plurality of composite material blades, each blade including a root engaged between two adjacent teeth of the holder disk and that is held against the teeth by a pivot connection; a clamp disk including a plurality of teeth at its periphery extending in an axial direction, the clamp disk being fastened against the holder disk and on the same axis, with each of its teeth taking up a circumferential position between a blade root and a tooth of the holder disk; and a mechanism exerting a clamping force in a circumferential direction urging the teeth of the clamp disk against the blade roots.

12 Claims, 4 Drawing Sheets

(56) References Cited

U.S. PATENT DOCUMENTS

| | | | | |
|---|---|---|---|---|
| 2,948,505 A * | 8/1960 | Sonder | F01D 5/021 |
| | | | 416/500 |
| 2,988,324 A * | 6/1961 | Sutters | F01D 5/06 |
| | | | 416/201 R |
| 3,008,689 A * | 11/1961 | Cook | F01D 5/323 |
| | | | 416/193 A |
| 3,023,998 A * | 3/1962 | Sanderson, Jr. | F01D 5/3007 |
| | | | 415/173.7 |
| 3,077,811 A * | 2/1963 | Moore | F01D 5/3007 |
| | | | 220/320 |
| 3,165,294 A * | 1/1965 | Anderson | F01D 5/06 |
| | | | 416/220 R |
| 3,266,770 A * | 8/1966 | Harlow | F01D 5/081 |
| | | | 416/174 |
| 3,300,179 A * | 1/1967 | Gooderum | F01D 5/3015 |
| | | | 416/221 |
| 3,356,340 A * | 12/1967 | Bobo | F01D 5/081 |
| | | | 415/115 |
| 3,554,668 A * | 1/1971 | Wagle | F01D 5/06 |
| | | | 416/198 A |
| 3,666,376 A * | 5/1972 | Damlis | F01D 5/22 |
| | | | 416/219 R |
| 3,734,646 A * | 5/1973 | Perkins | F01D 5/326 |
| | | | 416/193 A |
| 3,748,060 A * | 7/1973 | Hugoson | F01D 5/3015 |
| | | | 416/193 A |
| 4,033,705 A * | 7/1977 | Luebering | F01D 5/326 |
| | | | 416/220 R |
| 4,097,276 A * | 6/1978 | Six | B22F 5/04 |
| | | | 29/889.21 |
| 4,344,740 A * | 8/1982 | Trenschel | F01D 5/3015 |
| | | | 416/193 A |
| 4,389,161 A * | 6/1983 | Brumen | F01D 5/326 |
| | | | 416/198 A |
| 4,566,857 A * | 1/1986 | Brumen | F01D 5/326 |
| | | | 416/220 R |
| 4,781,534 A * | 11/1988 | Ferleger | F01D 11/006 |
| | | | 416/193 A |
| 4,802,824 A * | 2/1989 | Gastebois | F01D 5/282 |
| | | | 416/193 A |
| 4,859,149 A * | 8/1989 | McClain | F01D 5/32 |
| | | | 416/193 A |
| 5,030,063 A * | 7/1991 | Berger | F01D 11/006 |
| | | | 416/220 R |
| 5,256,035 A * | 10/1993 | Norris | F01D 5/3015 |
| | | | 416/220 R |
| 5,263,823 A * | 11/1993 | Cabaret | F01D 11/006 |
| | | | 416/218 |
| 5,277,548 A * | 1/1994 | Klein | F01D 11/008 |
| | | | 29/889.21 |
| 5,281,098 A * | 1/1994 | Glynn | F01D 5/3015 |
| | | | 416/220 R |
| 5,743,713 A * | 4/1998 | Hattori | F01D 5/14 |
| | | | 416/215 |
| 6,595,755 B2 * | 7/2003 | Brioude | F01D 21/045 |
| | | | 416/220 R |
| 7,806,662 B2 * | 10/2010 | Gekht | F01D 5/323 |
| | | | 416/221 |
| 2003/0194319 A1 * | 10/2003 | Zabawa | F01D 21/04 |
| | | | 416/2 |
| 2005/0106019 A1 * | 5/2005 | Lardellier | F04D 5/00 |
| | | | 416/96 R |
| 2006/0083621 A1 * | 4/2006 | Klingels | F01D 5/3038 |
| | | | 416/215 |
| 2008/0226458 A1 * | 9/2008 | Pierrot | F01D 5/323 |
| | | | 416/220 R |
| 2010/0166560 A1 * | 7/2010 | Blanchard | F01D 5/282 |
| | | | 416/214 A |
| 2010/0189562 A1 | 7/2010 | Blanchard et al. | |

FOREIGN PATENT DOCUMENTS

| | | | | |
|---|---|---|---|---|
| FR | 2918409 A1 * | 1/2009 | | F01D 5/30 |
| FR | 2 941 487 | 7/2010 | | |

* cited by examiner

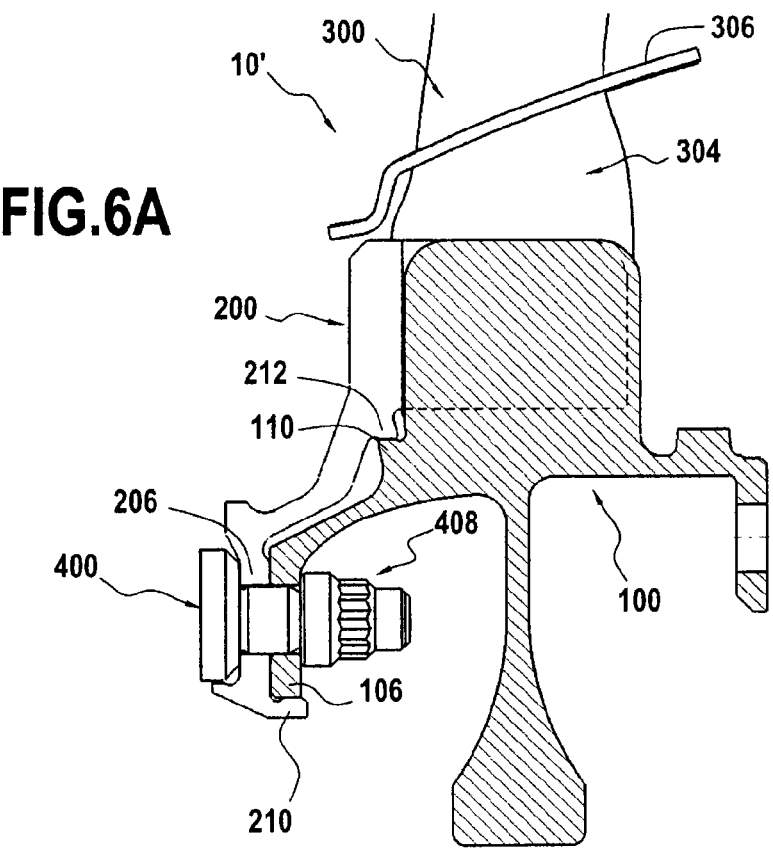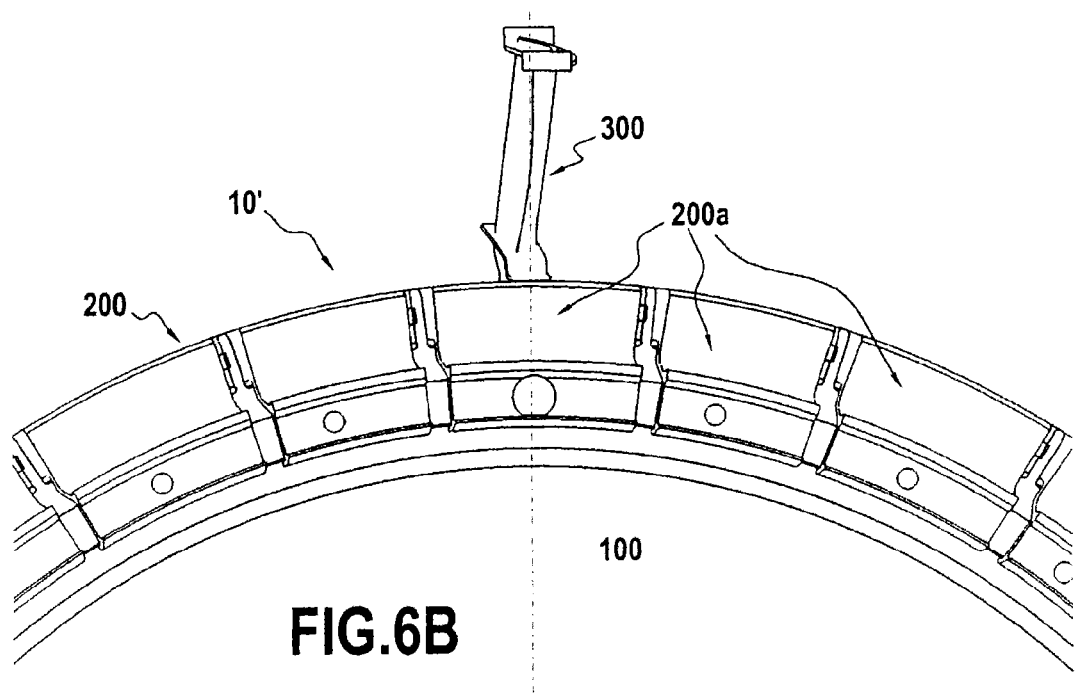

GAS TURBINE ENGINE ROTOR WHEEL HAVING COMPOSITE MATERIAL BLADES WITH BLADE-ROOT TO DISK CONNECTION BEING OBTAINED BY CLAMPING

BACKGROUND OF THE INVENTION

The invention relates to mounting composite material blades on a disk of a rotor wheel of a gas turbine engine.

The intended field is that of aeroengines and of industrial turbines.

A rotor wheel of a gas turbine engine, e.g. such as a low pressure turbine wheel of an aeroengine, generally comprises a disk having a plurality of slots at its periphery, each slot having a blade of the wheel mounted therein via its respective root.

It is becoming common practice to replace metal blades for such a rotor wheel with blades that are made out of composite material, with the rotor disks continuing to be made out of metal. The use of a composite material for fabricating blades is justified by very good ability at withstanding the high temperatures to which the blades are subjected. Reference may be made for example to patent application FR 2 939 129 filed jointly in the names of Snecma and Snecma Propulsion Solide, which application describes the fabrication of a turbine engine blade by making a fiber preform by three-dimensional weaving and densifying the preform with a matrix.

Compared with a metal blade obtained by casting, a composite material blade presents certain drawbacks, in particular associated with mounting it on a metal disk. In particular, a method of the kind described in document FR 2 939 129 does not make it possible to obtain blades with dimensional tolerances that are as fine and as accurate as can be obtained with metal blades. This results in large amounts of functional clearance between the blade roots and the slots of the disks in which they are mounted. Unfortunately, such clearance leads to the blades tilting about their roots, thereby reducing the performance of the engine (gas leakage between the blade platforms is increased).

OBJECT AND SUMMARY OF THE INVENTION

A main object of the present invention is thus to propose a wheel that does not present the above-mentioned drawbacks.

This object is achieved by a rotor wheel for a gas turbine engine, the wheel comprising:

a metal holder disk having a plurality of teeth at its periphery, the teeth extending radially outwards from the disk;

a plurality of composite material blades, each blade having a root that is engaged between two adjacent teeth of the holder disk and that is held against said teeth by a pivot connection;

a clamp disk having a plurality of teeth at its periphery extending in an axial direction, the clamp disk being fastened against the holder disk and on the same axis, with each of its teeth taking up a circumferential position between a blade root and a tooth of the holder disk; and means for exerting a clamping force in a circumferential direction urging the teeth of the clamp disk against the blade roots.

With such a wheel, the blades are held on the holder disk by having their roots clamped against the disk. More precisely, the blade roots are clamped between the teeth of the two disks making up the wheel. The connections between the composite material blades and the metal disks are thus made more rigid, thus serving to reduce the clearances between the blades, thereby avoiding losses of engine performance.

Preferably, the clamp disk is fastened to the holder disk by means of a helical connection enabling a clamping force to be exerted in a circumferential direction urging the teeth of the clamp disk against the blade roots. This helical connection may comprise a plurality of positioning screws, each passing through two holes with offset centers that are formed in respective fastener flanges of the disks.

Also preferably, each pivot connection comprises a peg that extends in a circumferential direction from one of the side faces of a respective one of the teeth of the holder disk and that passes through a hole made in the corresponding blade root.

Each blade root may have a first side face that bears flatly against a side face of a tooth of the holder disk, and a second side face opposite from the first and that bears flatly against a side face of a tooth of the clamp disk.

Advantageously, the wheel further includes means for centering the clamp disk on the holder disk.

The clamp disk may comprise a plurality of angular disk segments that are arranged circumferentially end to end.

Each blade root may come into radial abutment against the bottom of a groove defined between two adjacent teeth of the holder disk. Alternatively, each blade root may come axially into abutment against the bottom of a groove defined between two adjacent teeth of the clamp disk.

The invention also provides a gas turbine engine including at least one wheel as defined above.

BRIEF DESCRIPTION OF THE DRAWINGS

Other characteristics and advantages of the present invention appear from the description made below with reference to the accompanying drawings showing embodiments having no limiting character. In the figures:

FIGS. 6A and 6B are respectively a longitudinal section view and a perspective view of a rotor wheel in a variant embodiment of the invention.

DETAILED DESCRIPTION OF EMBODIMENTS

Figure 1:
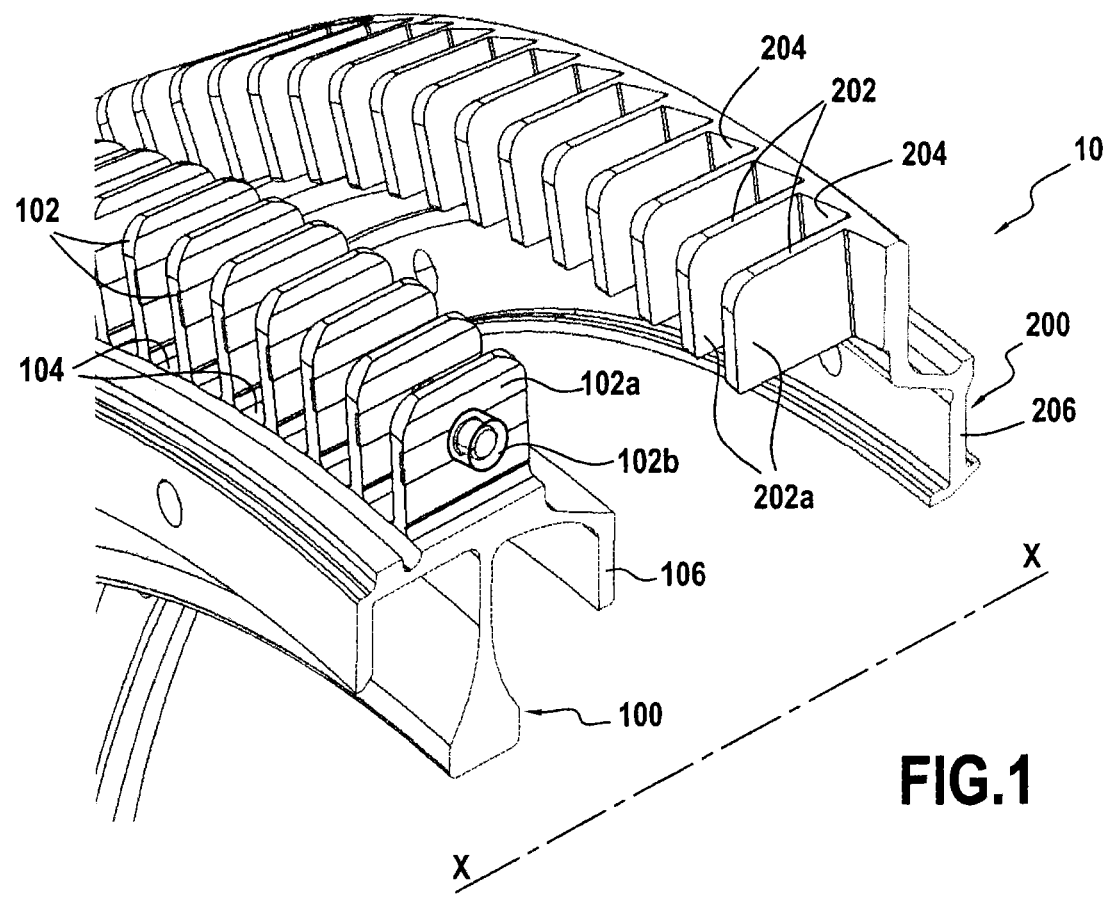
FIGS. 1 and 2 are exploded fragmentary views in perspective of a rotor wheel of the invention.
Figure 2:
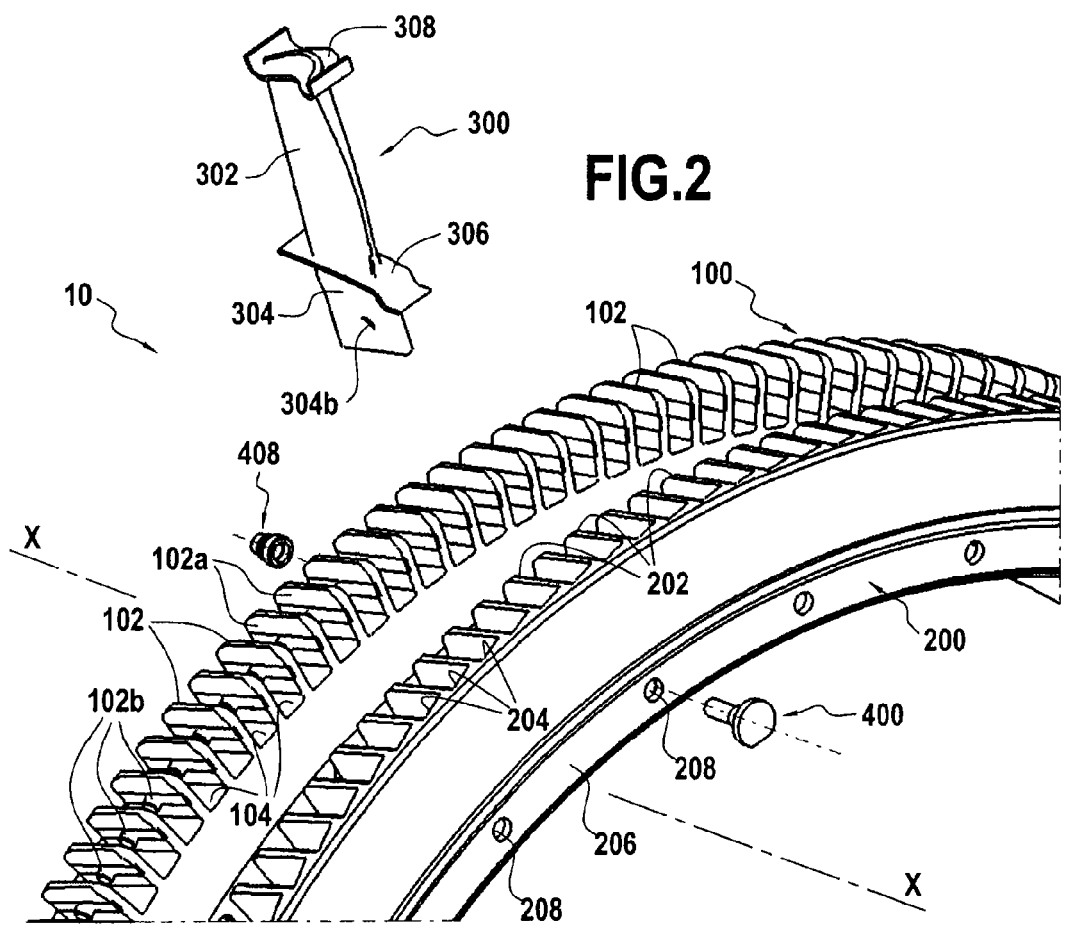

FIGS. 1 and 2 are exploded fragmentary views of a rotor wheel 10 of the invention. Each wheel comes from a low pressure turbine stage of an aviation turbine engine. Naturally, the invention applies more generally to any rotor wheel of a gas turbine engine (whether for aviation or for industry).

The wheel comprises a holder disk 100 and a clamp disk 200, these disks being made of metal and centered on the longitudinal axis X-X of the low pressure turbine, about which axis they are set into rotation.

The holder disk 100 is provided at its periphery with a plurality of teeth 102 projecting radially outwards from the disk. These teeth 102 are regularly spaced apart from one another around the entire circumference of the disk and they define grooves 104 between them.

The teeth 102 present side faces 102a that are substantially plane. One of the side faces of each of these teeth carries a peg 102b that extends from said side face in a circumferential direction. Such a peg may present a right cross-section that is substantially circular as shown in FIG. 1, or it may be of some other shape.

The holder disk 100 also has an annular fastener flange 106 that extends upstream (relative to the flow direction of the gas stream passing through the turbine).

The clamp disk 200 is provided at its periphery with a plurality of teeth 202 that extend in an axial direction. The number of these teeth is the same as the number of the teeth 102 of the holder disk, and each tooth presents side faces 202a that are substantially plane. The teeth are regularly spaced apart from one another all around the circumference of the disk, and between them they define grooves 204.

The clamp disk 200 also has an annular fastener flange 206 that extends upstream from the bottoms of the grooves. This fastener flange is for mounting against the corresponding fastener flange 106 of the holder disk 100.

The wheel 10 also has a plurality of blades 300 that are made of composite material, e.g. a ceramic matrix composite (CMC) material, using methods known to the person skilled in the art. By way of example, reference may be made to patent application FR 2 939 129 filed jointly in the names of Snecma and Snecma Propulsion Solide, which application describes the fabrication of such a blade comprising a fiber reinforcement obtained by three-dimensionally weaving yarns, the reinforcement being densified by a matrix.

More precisely, each blade 300 comprises an airfoil 302, a root 304, an inner platform 306 situated between the root and the airfoil, and possibly an outer platform 308 in the vicinity of its free end. Document FR 2 939 129, the content of which is incorporated herein by reference, describes an embodiment of such a blade that is made as a single piece.

Furthermore, the root 304 of each blade 300 presents first and second side faces 304a that are substantially plane and that have a through orifice 304b of a shape that is complementary to the pegs 102b of the teeth 102 of the holder disk. Such an orifice may be fabricated during the blade fabrication process, either by using an insert of corresponding shape during weaving, or by piercing the root after the first infiltration.

Each blade 300 is held on the holder disk in particular by means of the clamp disk in application of the following technique (see FIGS. 3, 4, 5A, and 5B).

The root 304 of each blade is initially mounted between two adjacent teeth 102 of the clamp disk: more precisely, it is mounted in such a manner that its first side face comes to bear flatly against the side face of the tooth that has a peg 102b, the peg passing through the orifice 304b in the root so as to make a pivot connection between the blade root and the corresponding tooth of the holder disk.

The clamp disk 200 is then brought up axially from upstream to downstream in such a manner that each of its teeth 202 occupies a circumferential position between a blade root 304 and a tooth 202 of the holder disk. More precisely, one of the side faces 202a of the tooth in question of the clamp disk comes to bear flatly against the second side face 304a of the blade root.

Finally, a clamping force in a circumferential direction is exerted by the teeth 202 of the clamp disk 200 against the blade roots 304. This clamping force is obtained by means of a helical connection between the holding and clamp disks, as described below with reference to FIGS. 5A and 5B.

As mentioned above, the clamp disk 200 of the wheel is fastened to the holder disk 100 by means of the respective fastener flanges 206 and 106 of those disks. For this purpose, each of the fastener flanges 206 and 106 presents a plurality of holes given respective references 208 and 108, which holes are regularly distributed about the axis X-X. The holes 208 in the clamp disk are distributed around the axis X-X in such a manner as to be slightly off-center relative to the holes 108 of the holder disk when the holder disk is placed on the clamp disk (this small centering off-center is represented diagrammatically by reference Y in FIG. 5A).

Positioning screws 400 are passed through each facing pair of holes in each of the fastener flanges of the disk. Each of these screws presents a threaded shank 402 of diameter that is smaller than the diameter of the holes 108, 208 so as to be capable of passing through them without making contact. Furthermore, the threaded shank is connected to a screw head 404 by means of a cylinder 406 of greater diameter (the difference in diameter between the cylinder 406 and the threaded shank 402 is equal to at least twice the value of the offset Y).

Figure 5A:
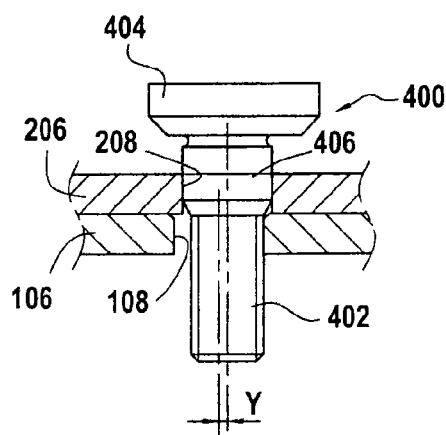
FIGS. 5A and 5B show an embodiment of the helical connection between the disks of the wheel of FIGS. 1 and 2.
Figure 5B:
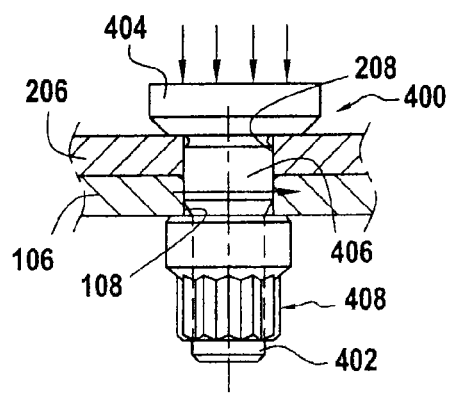
Figure 4:
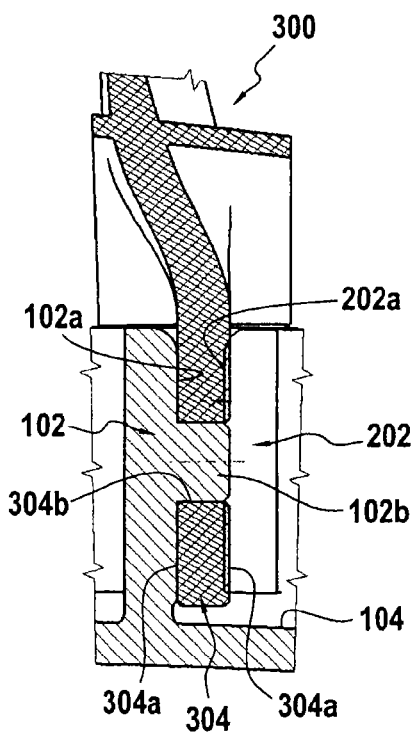
FIG. 4 is a section view on IV-IV of FIG. 3.

As shown in FIG. 5B, a sufficient pressure force applied to the heads 404 of the screws 400 enables the holes 108 and 208 to be brought back into alignment (the offset Y becomes zero), thereby having the effect of the clamp disk being caused to pivot a little about the axis X-X while exerting a clamping force between its teeth and the blade roots. Nuts 408 are then screwed onto the threaded shanks 402 of the screws.

Thus, the roots 304 of the blades 300 are clamped between the two disks 100 and 200 of the wheel, thereby ensuring that the blades are properly held. This clamping is performed with clearance that is calculated as a function of the expansion clearances and the geometrical dispersions due to manufacturing tolerances and to the movements of the disks.

It should be observed that the blades may be oriented on the disks either by putting each blade root 304 into radial abutment against the bottom of the corresponding groove 104 of the holder disk, or else by putting each blade root into axial abutment against the bottom of the groove 204 of the clamp disk.

Figure 3:
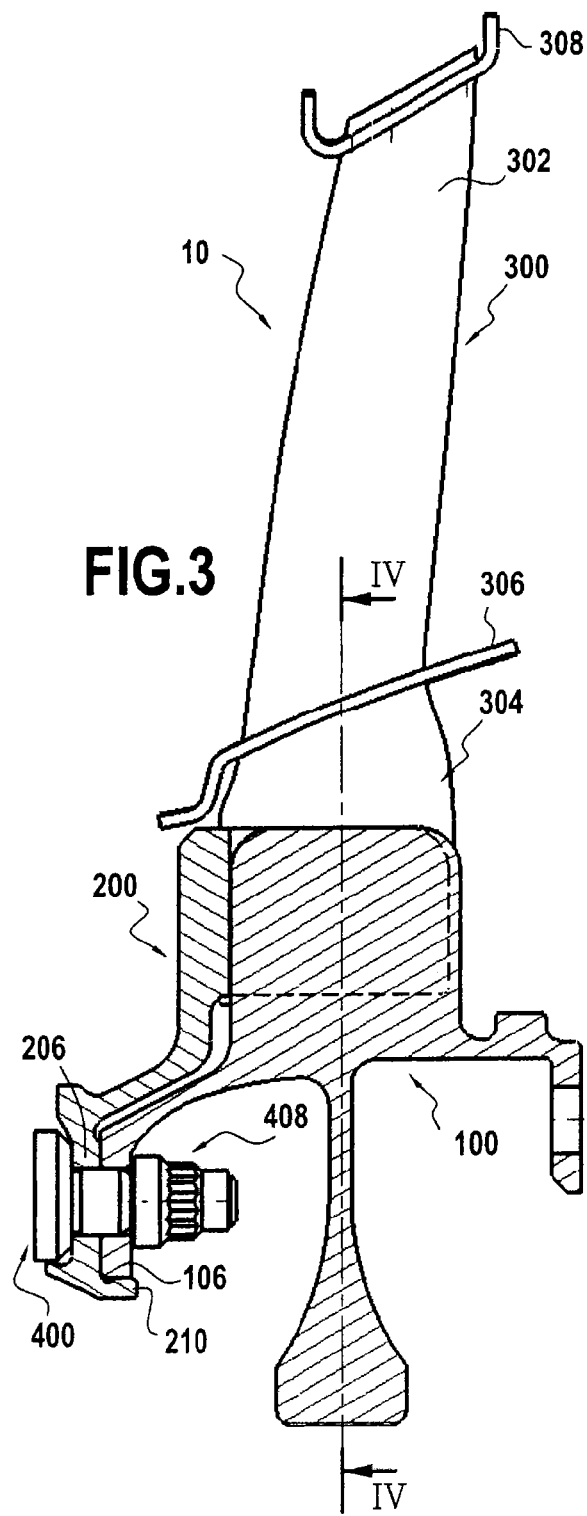
FIG. 3 is an axial section view of the FIG. 1 wheel when assembled.

It should also be observed that centering means are advantageously provided for centering the clamp disk 200 on the holder disk 100. As shown in FIG. 3, such centering may be performed by means of an annular shoulder 210 formed at the free end of the fastener flange 206 of the clamp disk and coming to be received under the fastener flange 106 of the holder disk. Thus, it is possible to keep the blade roots bearing flatly in position and to facilitate mounting the blades.

FIGS. 6A and 6B show a rotor wheel 10' in a variant embodiment of the invention.

This wheel differs from the above-described wheel in that the clamp disk 200 is made up of a plurality of angular disk segments 200a that are arranged circumferentially end to end so as to form a 360° ring. Such sectorization of the clamp disk makes it easier to mount it on the holder disk 100.

Furthermore, in this variant embodiment, dual centering of the clamp disk on the holder disk is provided: first centering is performed by the annular shoulder 210 formed at the free end of the fastener flange 206 of the clamp disk that is received under the fastener flange 106 of the holder disk; and second centering is provided by an annular shoulder 212 of the clamp disk that takes up position against a corresponding annular shoulder 110 of the holder disk (FIG. 6A).

The invention claimed is:

1. A rotor wheel for a gas turbine engine, the wheel comprising:
   a metal holder disk including a plurality of teeth at an outer radial periphery of the holder disk, the teeth of the holder disk being planar having first and second side faces which are parallel to each other and extending radially outwards from the holder disk;
   a plurality of composite material blades, each blade including a root that is planar having first and second side faces which are parallel to each other and engaged between two adjacent teeth of the holder disk and that is held against the teeth by a pivot connection such that each respective blade root pivots around an axis passing through the teeth holding the respective blade root; and a clamp disk including a plurality of teeth at a periphery of the clamp disk, the teeth of the clamp disk being planar and extending in an axial direction, the clamp disk being fastened against the holder disk and on a same axis, with each of the teeth of the clamp disk taking up a circumferential position between one of the blade roots and one of the teeth of the holder disk, wherein the first side face of each blade root bears flatly against the first side face of one of the teeth of the holder disk, and the second side face of each blade root, opposite from the first side face of the respective blade root, bears flatly against a side face of one of the teeth of the clamp disk.

2. The rotor wheel according to claim 1, wherein the clamp disk is fastened to the holder disk by a helical connection enabling a clamping force to be exerted in a circumferential direction urging the teeth of the clamp disk against the blade roots.

3. The rotor wheel according to claim 2, wherein the helical connection comprises a plurality of positioning screws, each passing through two holes with offset centers that are formed in respective fastener flanges of the holder disk and the clamp disk.

4. The rotor wheel according to claim 1, wherein each pivot connection comprises a peg that extends in a circumferential direction from one of the side faces of a respective one of the teeth of the holder disk and that passes through a hole made in a corresponding blade root.

5. The rotor wheel according to claim 1, further comprising means for centering the clamp disk on the holder disk.

6. The rotor wheel according to claim 1, wherein the clamp disk comprises a plurality of angular disk segments that are arranged circumferentially end to end.

7. The rotor wheel according to claim 1, wherein each blade root comes into radial abutment against a bottom of a groove defined between two adjacent teeth of the holder disk.

8. The rotor wheel according to claim 1, wherein each blade root comes axially into abutment against a bottom of a groove defined between two adjacent teeth of the clamp disk.

9. The rotor wheel according to claim 1, wherein the blades are made of ceramic matrix composite material.

10. A gas turbine engine comprising at least one rotor wheel according to claim 1.

11. The rotor wheel according to claim 1, wherein the teeth of the clamp disk have first and second side faces which are parallel to each other.

12. The rotor wheel according to claim 11, wherein the first and second side faces of the teeth of the holder disk, the first and second side faces of the blade roots, and the first and second side faces of the teeth of the clamp disk extend substantially perpendicular to a rotation axis of the rotor wheel.

* * * * *